INVENTORS
Darrell W. Williams
Albert B. Crownover, Jr.

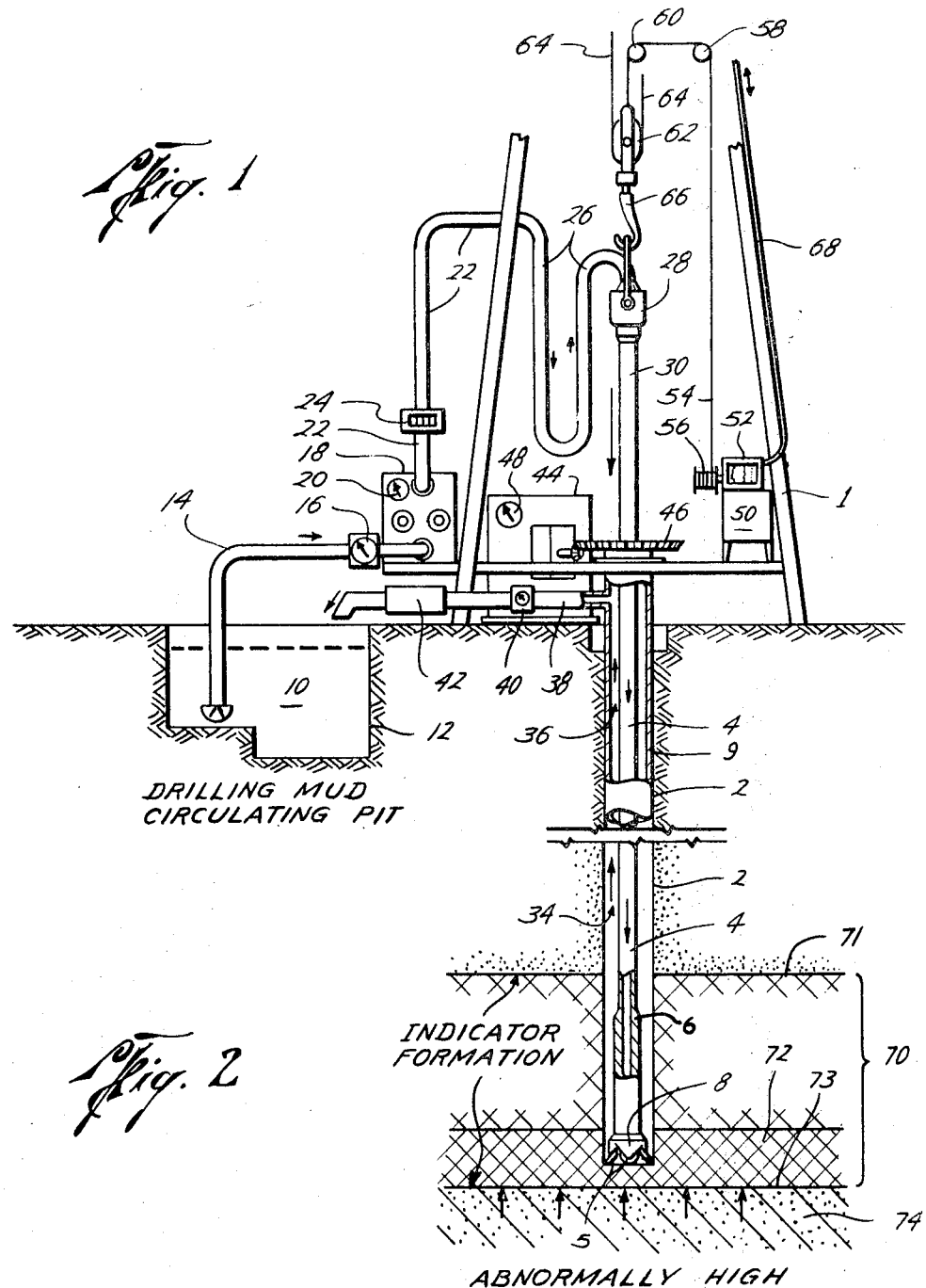
Fig. 1
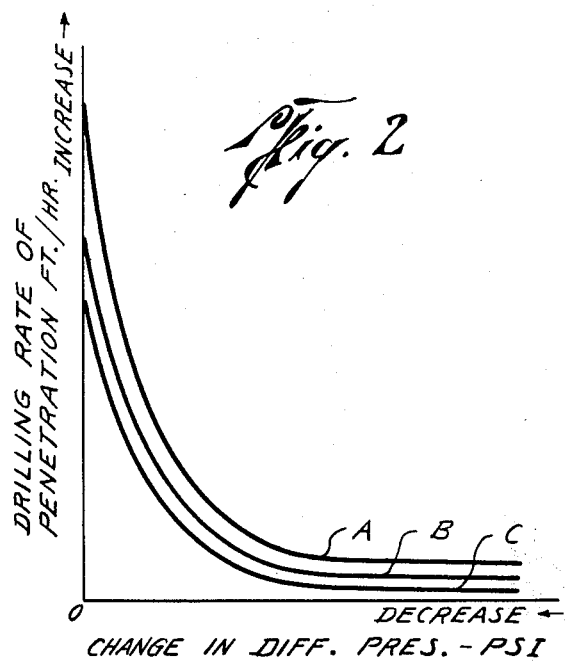
Fig. 2
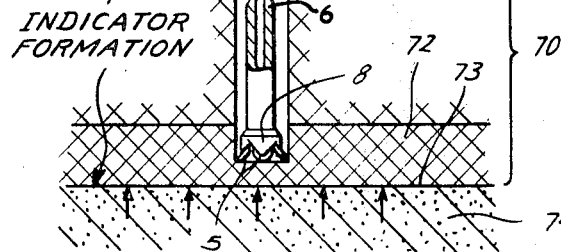
INVENTORS
Darrell W. Williams
Albert B. Crownover, Jr.
BY
ATTORNEY

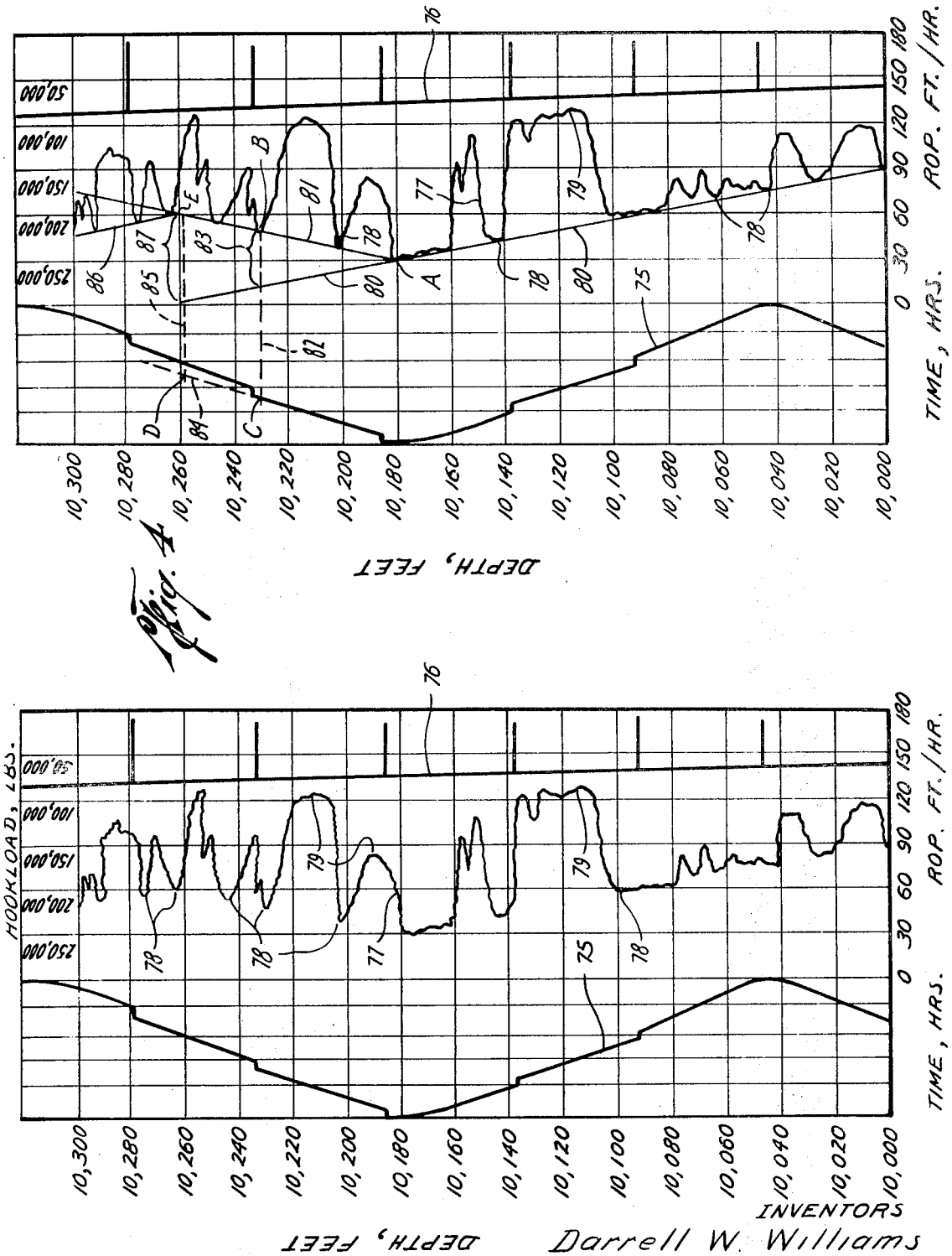

BY *Eugene S. Cadden*

ATTORNEY

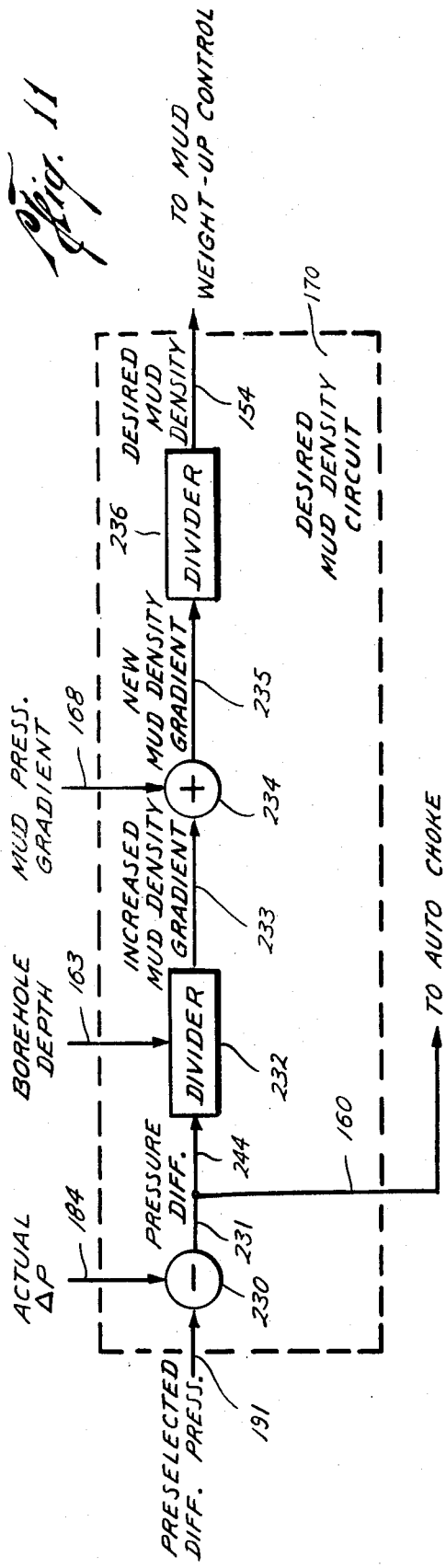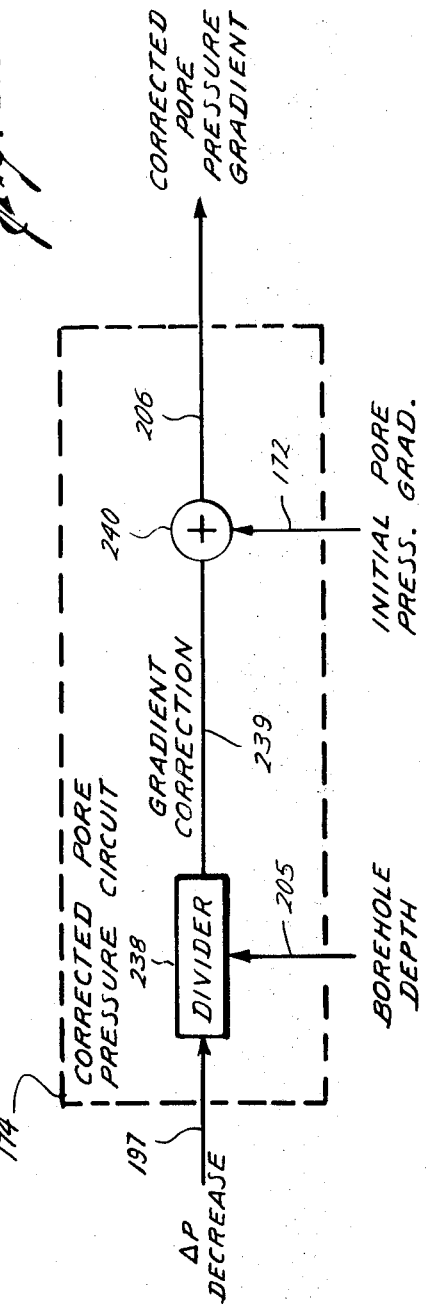

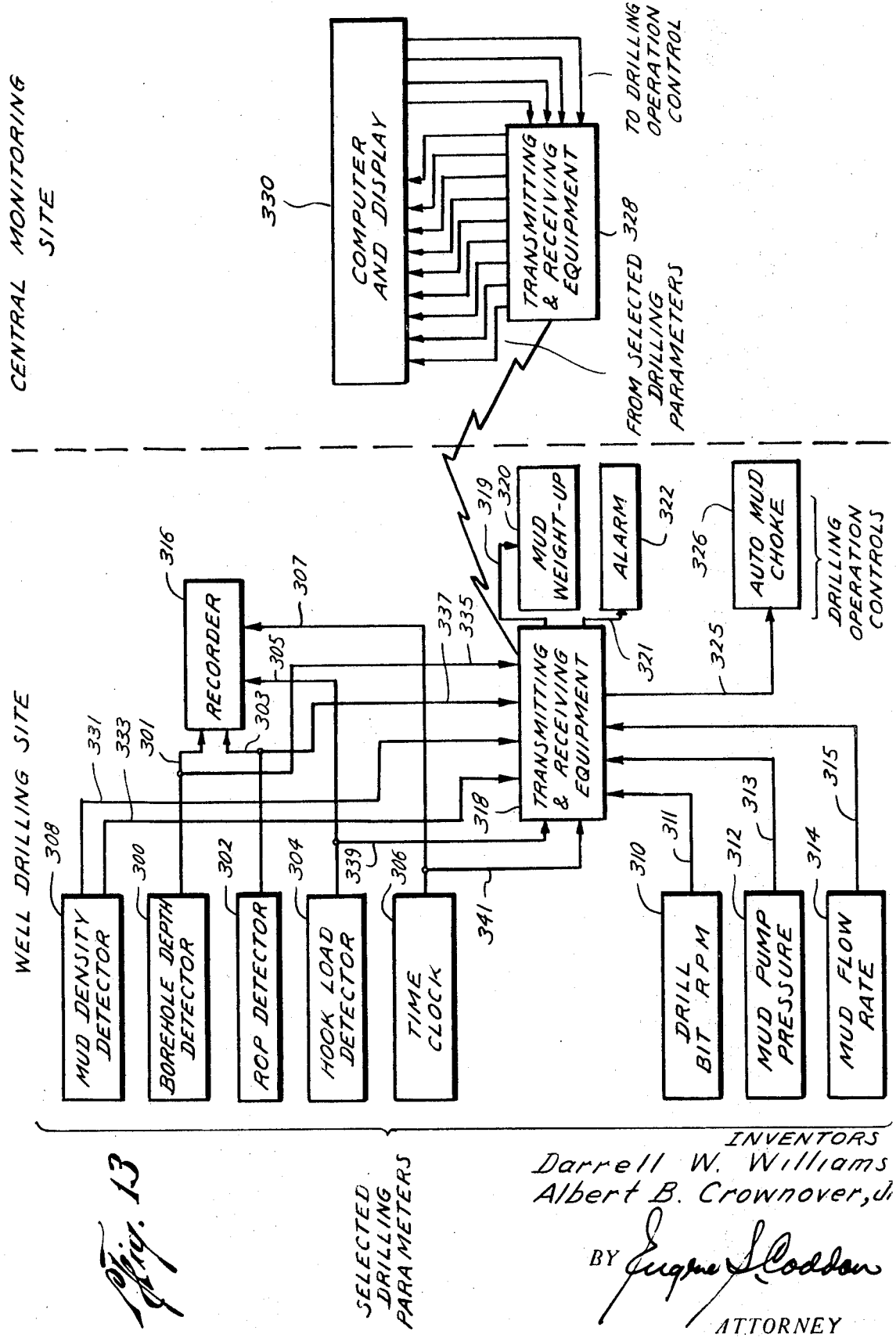

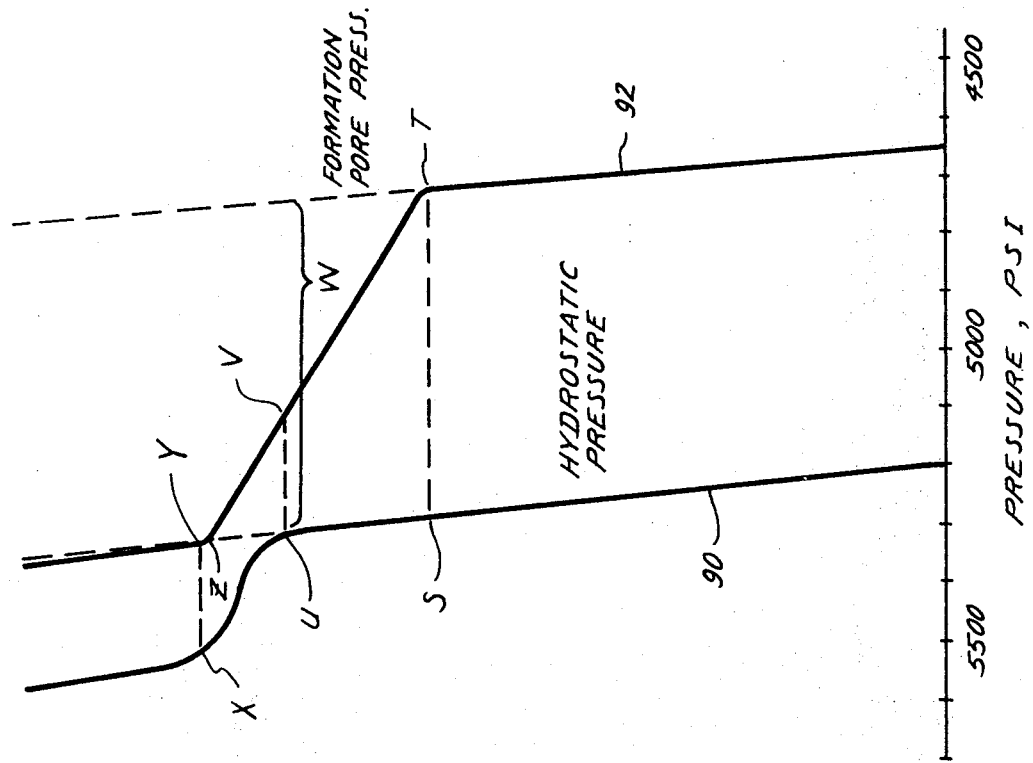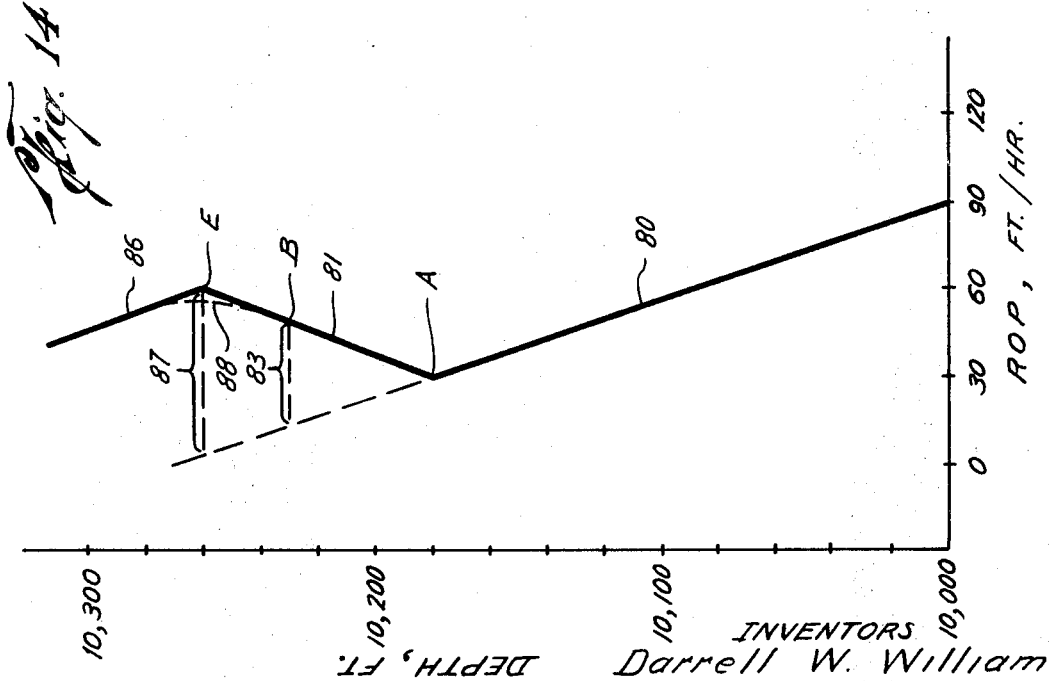

3,517,553
METHOD AND APPARATUS FOR MEASURING AND CONTROLLING BOTTOMHOLE DIFFERENTIAL PRESSURE WHILE DRILLING

Darrell W. Williams and Albert B. Crownover, Jr., Lafayette, La., assignors to Tenneco Oil Company, Houston, Tex., a corporation of Delaware
Filed Dec. 6, 1967, Ser. No. 688,393
Int. Cl. E21b 47/06
U.S. Cl. 73—152                        11 Claims

ABSTRACT OF THE DISCLOSURE

Method and apparatus are provided for measuring and controlling the bottomhole pressure differential while drilling oil and gas wells. The magnitude of change in bottomhole pressure differential may be derived as a function of changes in the actual rate of penetration from an expected rate through a preselected class of formations. A corrected bottomhole pressure differential may be derived as a function of hydrostatic pressure, the expected formation pore pressure and the change in pressure differential.

---

This invention relates to methods and apparatus for drilling oil and gas wells and more particularly relates to methods and apparatus for determining the variations in bottomhole pressure differential while drilling oil and gas wells.

BACKGROUND OF THE INVENTION

It is well known that oil and gas deposits are contained in subterranean earth formations and that boreholes are drilled into these formations for the purpose of recovering these petroleum deposits. During the drilling operation, it is common to pump a drilling fluid, generally known as "drilling mud," into the borehole through the drill string to lubricate the bit, maintain a hydrostatic pressure head to overbalance the subterranean formation pressures, and carry the drill cuttings to the surface of the borehole.

It is also well known that subterranean formation pressures generally increase with depth. Low-permeability formations, such as shales, exhibit a pressure that is the measure of the pressure exerted by fluid trapped within the non-interconnected interstices or pores of the formation. The measure of this pressure is commonly called "formation pore pressure." In permeable formations the exhibited pressure is a measure of the fluid trapped within the interconnected interstices or pores of the formation, and is generally referred to as "formation pressure." Further, it is generally known that low-permeability formations, such as shales, commonly overlie abnormally high-pressured permeable formations, thus trapping the high-pressured fluid within the porous formation.

A critical problem in all oil and gas well drilling operations is the maintenance of a sufficient hydrostatic pressure head of drilling mud to overbalance the subterranean formation pressure at the bottom of the borehole. A pressure overbalance or "bottomhole pressure differential" must be maintained in order to prevent the high-pressured fluids within porous formations from being released through the borehole to the atmosphere. Such a release of the high-pressured fluid within the formation through the borehole is commonly called a "blowout" in which the drilling mud and drill string are expelled from the borehole. A blowout can irreparably damage the borehole and damage or destroy hundreds of thousands of dollars worth of drilling equipment, to say nothing of the irreplaceable loss of drilling personnel due to death and injury.

A well known drilling technique to control bottomhole pressure differential is to increase the hydrostatic pressure exerted by the column of drilling fluid at a rate equal to or greater than the increases in formation pressures. Using a drilling mud of a known density, the hydrostatic pressure at the bottom of the borehole increases directly with increased depth. If formation pressures are increasing with depth at a rate faster than the hydrostatic pressure, a point will be reached where the pressure differential will reach zero and a blowout may occur.

In the past, in order to determine bottomhole differential pressures, the drill string had to be removed and a pressure measuring device lowered into the borehole to measure the bottomhole formation pressure. Once the bottomhole formation pressure was determined, the drilling engineer could determine a minimum pressure differential, based on the known drilling mud density, consistent with safety for continued drilling. Of course, it was assumed that formation pressures would continue to increase regularly with increased depths.

It is further a well known technique to vary the hydrostatic pressure of the column of drilling mud by changing its weight per given volume or "density." Since the hydrostatic pressure is a measure of the downward pressure exerted by the volume of drilling fluid in the borehole, increasing the density of the drilling mud increases its weight per given volume and increases the hydrostatic pressure exerted against the bottom of the well bore.

The hydrostatic pressure of the column of drilling mud during drilling exhibits a linear increase with increased depth, and the pressure exerted by a known volume of drilling mud per each foot of borehole depth can be expressed as a pressure gradient. The pressure gradient when multiplied by the borehole depth provides a measure of the bottomhole hydrostatic pressure by the drilling mud. Similarly, certain classes of low-permeability formations, such as shales, exhibit a linear change in formation pore pressure per foot of increased depth and the rate of increase can be expressed as a formation pore pressure gradient which, when multiplied by borehole depth, yields a measure of the formation pore pressure in the borehole.

It can be seen that as long as the mud pressure gradient exceeds the formation pore pressure gradient of the subterranean formations the hydrostatic pressure head of the drilling mud will overbalance the formation pore pressure and a positive bottomhole pressure differential will exist. However, porous formation pressures may differ widely due to varying pressures exerted by trapped fluids within the formations. If the formation pressure exerted by a porous formation exceeds the hydrostatic pressure head of the drilling mud, the aforementioned phenomena of a blowout can occur.

Another phenomena that is well known is that as well depth increases, drilling penetration rate decreases. The decrease in drilling rate of penetration with depth is primarily due to the increase in bottomhole pressure differential with depth. As depth increases the bottomhole pressure differential has a direct effect on the drillability of the encountered formations. To understand this effect, the "self chipping" of a formation must be understood. As the drill bit teeth fracture and gouge the formation, the internal pore pressure of the formation tends to "explode" the surface layers of the formation adjacent the bit into chips and fragments, thus aiding in the drilling process. However, as the bottomhole pressure differential increases, the increased pressure is exerted against the face of the formation and exerts a "chip hold-down" force that counteracts the "self chipping" force exerted by the formation pore pressure and makes the cutting task of the bit more difficult and it penetrates at a slower rate.

Of course, a faster rate of penetration means faster completion of a well with the corresponding savings in time and drilling costs. The drilling engineer would like to maintain a minimum drilling mud density to provide a minimum bottomhole differential pressure to increase the drilling rate of penetration, but would also allow a margin of safety if an abnormally high-pressured formation is encountered.

If bottomhole differential pressures are maintained at a low level to increase rate of penetration, a danger of blowout at an intermediate formation previously penetrated is a real hazard. On the other hand, if the pressure differential is maintained at too high a level, a lower drilling efficiency results and a permeable formation previously penetrated may be fractured. Fracturing results in a loss of drilling mud into that formation, impairing mud circulation in the borehole and further lowering the bottomhole pressure differential. If subterranean formation pressure could be accurately predicted, there would be no problem in maintaining a minimum pressure differential to provide a maximum rate of penetration. Just the opposite is generally true, abnormally pressured formation are commonly not predictable and hence a safety margin of pressure differential is desired while drilling.

Engineers and geologists have long sought to devise methods to predict the occurence of abnormally high-pressured permeable formations. Since shale formations normally overlie such high-pressured formations, shales have become "indicators" of underlying abnormally pressured porous formations. It is generally known that the high-pressured fluid of the underlying porous formation will, over long geological periods of time, permeate a lower zone of the overlying low-permeability formation and raise its pore pressure. Various techniques have been devised to detect this zone of higher pressure within the shale indicator formations and hence predict an underlying abnormally pressured formation.

One method is to sample shale cuttings circulated up by the drilling fluid from the bottom of the well bore. Density measurements of the shale cuttings are made and if the shale densities suddenly decrease, an abnormally high pore pressure is indicated with a corresponding indication that an abnormally high-pressured formation probably underlies the shale formation. Similarly, such density reversals can be correlated to electric log resistivity measurements commonly made during the drilling operation. Other techniques make use of detecting high-pressured fluids, such as gas and salt water, that are present in the mud circulated uphole. If the gas content in the drilling mud increases significantly, a higher pressured formation is signaled.

These techniques have only been able to predict the possible occurrence of an abnormally pressured formation but shed no light on the magnitude of increase in formation pressures and the magnitude of decrease in bottomhole differential pressure. Any increases in drilling mud density to increase the bottomhole pressure differential are not related directly to known decreases in differential pressure. Hence excess mud densities are often used, resulting in the aforementioned loss in drilling efficiency and substantially adding to the total drilling cost since the drilling mud used in drilling a well comprises a high proportion of the total drilling expense.

A certain degree of control over bottomhole formation pressure can be exerted by increasing the back pressure on the drilling fluid as it is circulated out of the borehole by decreasing the diameter of the drilling fluid outlet from the well casing at the borehole surface. This increases the resistance to the flow of the drilling mud from the well casing and is accomplished by means of a variable diameter sleeve in the outlet pipe called a "choke." Choking the mud flow out of the borehole while maintaining the same mud flow into the borehole through the drill string increases the back pressure on the drilling fluid.

Increasing the back pressure effectively increases the differential pressure in a relatively short period of time. However, a disadvantage of increasing the differential pressure appreciably by this technique is the fact that back pressure is exerted continuously throughout the depth of the borehole and does not have a gradient increase with depth as does the hydrostatic pressure due to mud density. This can cause serious problems of fracturing permeable formations and losing circulation of the drilling mud into the fractured formation as previously discussed.

At present, there are no accepted methods or apparatus in the prior art that provide immediate detection of abnormally high-pressured formations and provide a measurement of the magnitude of decrease in bottomhole differential pressure due to the increased formation pressures. These disadvantages of the prior art are overcome with the present invention, and novel methods and apparatus are provided herein for detecting a decrease in bottomhole pressure differential and measuring the magnitude of decrease during the drilling operation.

SUMMARY OF THE INVENTION

Applicant has discovered that the change in differential pressure at the bottom of a borehole during drilling is functionally related to a change in the rate of penetration of the drill bit through the hereinbefore mentioned "indicator" formations. These formations can be shales or any other class of non-permeable formations normally overlying abnormally pressured formations. By measuring the change in rate of penetration of the drill bit through such indicator formations, a quantitative decrease in bottomhole differential pressure, occasioned by an increase in the pore pressure of the indicator formation, can be measured and used to derive the correct actual bottomhole differential pressure. The "indicator" formations will hereinafter be referred to as shale formations.

When overlying an abnormally high-pressured formation, as previously discussed, the shale formations will have a lower zone or layer exhibiting an increased formation port pressure. As the drill bit penetrates this higher-pressured zone, the pressure differential is lowered and the "self chipping" action of the shale formation increases, adding to the efficiency of the bit and increasing the rate of penetration of the drill bit.

Since the pore pressure gradient of the shale indicator formations is expected to remain constant, and having a constant mud pressure gradient, the drilling rate of penetration should generally be decreasing linearly with depth through the shale formations. It is an indication of penetration by the drill bit into a higher pore pressure zone in a shale formation when the drilling rate of penetration through the shale formations begins to increase relative to the expected decrease due to the aforementioned constant pore pressure and mud pressure gradients.

In its basic concept, the present invention utilizes methods and apparatus to measure a quantitative change in the rate of penetration of the drill bit through the shale formations from an expected decreasing rate, and derives a measurement of the magnitude of change in bottomhole differential pressure functionally related to the change in rate of penetration. A measurement of the corrected actual bottomhole differential pressure may then be derived.

More specifically, in one embodiment of the present invention methods and apparatus are provided that determine the expected decreasing rate of penetration through the shale indicator formations and detect a change in the actual rate of penetration at a known bottomhole depth, measure the magnitude of deviation between the expected and actual rates of penetration at the known depth, determine the magnitude of change in bottomhole pressure differential at the known depth as a function of the difference in rates of penetration, determine the expected bottomhole pressure differential at the known depth, and determine the corrected bottomhole pressure differential at the known depth as a function of the difference between the expected pressure and the magnitude of change in the pressure differential.

Accordingly, a primary advantage of the present invention is the immediate detection and measurement of changes in bottomhole differential pressure during drilling operations.

Another primary advantage of the present invention is the direct measurement of change in bottomhole pressure differential from which the actual bottomhole pressure differential can be derived.

Another advantage of the present invention is that it significantly reduces the hazard of a well blowout, thereby reducing psychological fear of drilling crew personnel and increasing efficiency.

Still another advantage of the present invention is that it provides for control of bottomhole pressure differential in areas where no formation pressure in formation is available, thereby substantially reducing the hazards of blowouts in drilling such wells.

BRIEF DESCRIPTION OF THE DRAWINGS

The foregoing and other advantages and features of the present invention will be apparent from the following detailed description wherein reference is made to figures in the accompanying drawings, which drawings form a part of and are incorporated by reference as a part of this specification.

FIG. 1 is a longitudinal vertical section through a borehole penetrating subterranean formations and showing typical drilling apparatus in place during the drilling operation.

FIG. 2 is a graphical representation of the direct relationship between changes in drilling rates of penetration and changes in bottomhole differential pressure.

FIG. 3 is a pictorial representation of a section of a typical strip chart recorder log of depth, time, rate of penetration and hookload during the drilling operation.

FIG. 4 is a pictorial representation of a section of a typical strip chart recorder log having recorded thereon the same parameters as recorded in FIG. 3, and further illustrating baselines for rates of penetration of shale formations.

FIG. 11 is a detailed functional diagram of a further different portion of the apparatus generally shown in FIG. 8.

FIG. 12 is a detailed functional diagram of another different portion of the apparatus generally shown in FIG. 8.

FIG. 13 is a functional diagram of another form of apparatus capable of determining borehole differential pressure and controlling selected drilling functions according to the present invention.

FIG. 14 is a graphical representation of typical changes in rate of penetration through shale indicator formations during drilling operations and the corresponding plots of drilling mud hydrostatic pressure and the formation pore pressure.

DESCRIPTION OF THE PREFERRED EMBODIMENTS

Figure 5:
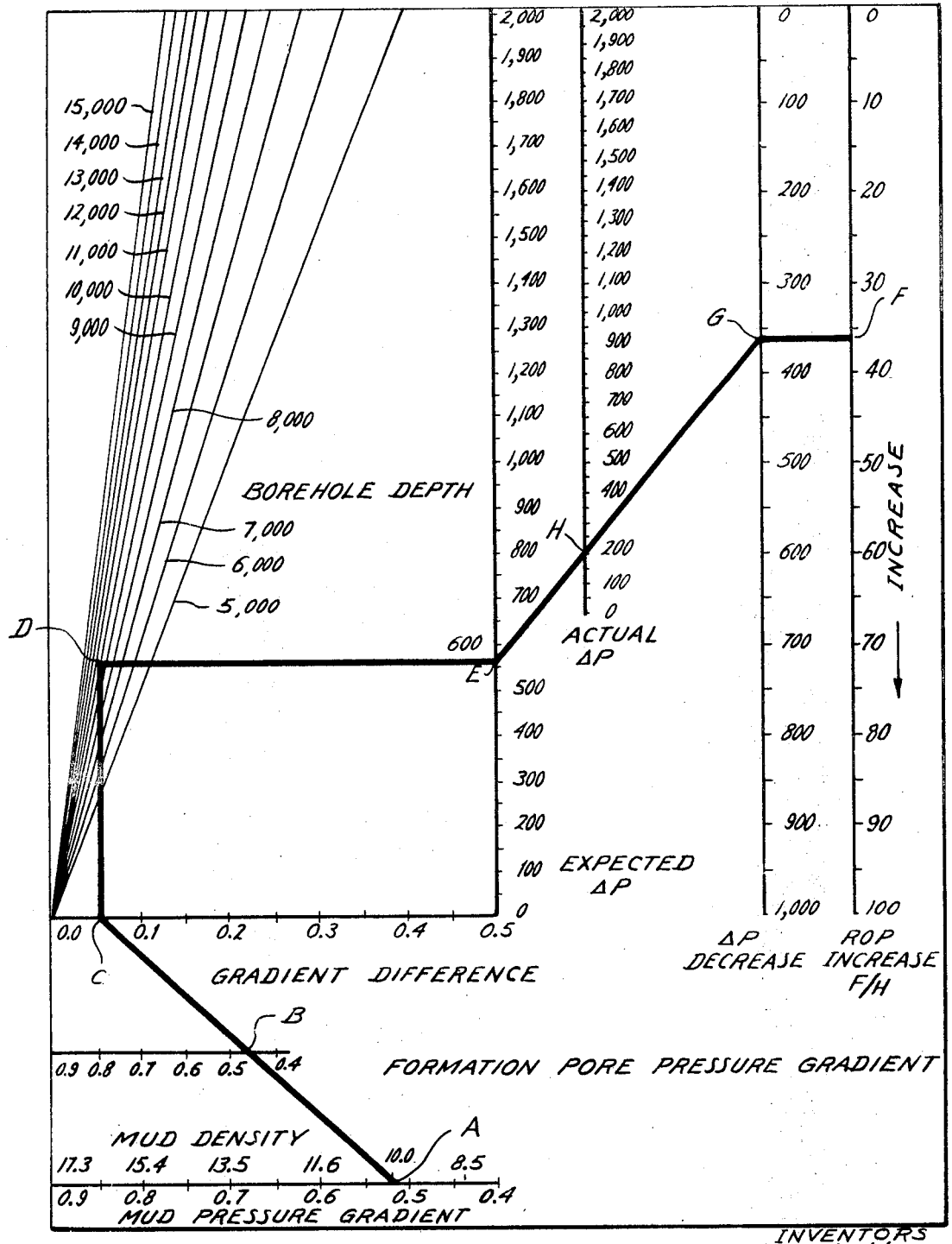
FIG. 5 is an illustration representative of one form of nomograph suitable for determining actual bottomhole pressure as a function of change in rate of penetration.

Referring now to FIG. 1, there may be seen a pictorial representation, partly in cross section, of a typical borehole including the drilling apparatus conventionally employed in the drilling operation. In particular, drilling rig 1 is shown in place over borehole 2 supporting travelling block 62, hook 66, swivel 28, kelly section 30, drill pipe 4, drill collars 6 and drill bit 8 within borehole 2 with casing 9 set to a preselected depth. Borehole 2 is shown in cross section as it penetrates a shale indicator formation 70 and the higher pressure layer 72 of the shale formation. Formation 70 overlies an abnormally high-pressured permeable formation 74.

As earlier described, it is a natural geological phenomena that shale indicator formations overlie abnormally high-pressured permeable formations, since it is the sealing effect of these low-porosity, high density and non-interconnected pore space formations that traps the abnormally high pressured fluids in the formation below. The increased pressure in layer 72 is due to the permeating of this zone by the high-pressured fluid from formation 74 over a long geological period of time. The pore pressure of the shale indicator formation increases from the top 71 of formation 70 to the bottom 73 abutting high-pressured formation 74. This increase in pore pressure lowers the bottomhole pressure differential and causes an increase in drilling rate of penetration due to the "self-chipping" action of the formation layer 72 as earlier described.

Drilling mud 10 is drawn from mud circulating pit 12 through a mud intake pipe 14 and mud weight detector 16 to a mud pump 18. Mud weight detector 16 measures the weight in lbs./gal. of the mud flowing into the borehole. The pump pressure of pump 18 can be varied and the operating pressure of pump 18 is indicated by meter 20. Drilling mud 10 is then pumped through a discharge pipe 22 where the mud flow rate is measured by a flow rate detector 24.

Flexible housing 26 conducts mud 10 from the discharge pipe 22 through swivel 28, kelly joint 30, drill pipe 4 and drill collars 6 to drill bit 8 where it is discharged past cutting heads 5 and circulated upwardly through the annulus 34 between drill pipe 4 and collars 6 and the bore hole 2, and through annulus 36 between drill pipe 4 and casing 9 in the direction as shown by the arrows. Mud 10 is forced sequentially through the discharge pipe sections 38, mud weight detector 40, and automatically adjustable choke 42, to thereafter be discharged into mud pit 12. Detector 40 measures and indicates the weight in lbs./gal. of the mud flow out of the borehole. The automatic choke device 42 is a radially compressive sleeve that can be opened or closed to vary the rate of mud flow out of the borehole. As the sleeve is closed, the flow is "choked" and back pressure is exerted on the mud circulating in the borehole.

Drive motor apparatus 44 drives rotary table 46 which engages the squared surfaces of the kelly joint 30 to rotate drill pipe 4, collars 6 and bit 8. The speed at which table 46 is rotated is indicated by an r.p.m. indicator 48. A suitable measuring device 50 is shown for measuring and recording hookload, borehole depth, drilling time elapsed and the drilling bit rate of penetration. A strip chart recorder 52 of measuring and recording device 50 continuously records traces of drilling time elapsed, rate of penetration and hookload with respect to borehole depth.

The measurement of depth and rate of penetration may conventionally be accomplished by means of a measuring line 54 passing over a measuring pulley 56 and leading over pulleys 58 and 60 to the traveling block 62 as shown in Pat. No. 2,658,725 issued to J. J. Arps entitled "Signal Transmission System for Use in Logging Drill Hole Formations." The measurement of the depth of the well or length of the drill pipe in the well is recorded on the log of recorder 52 in response to the downward movement of traveling block 62 as it follows the downward movement of the drill string into the well. Drilling rate of penetration is measured by deriving the movement of line 54 with respect to a fixed linear distance.

During the drilling operation, it is desirable to maintain a fixed weight on the rotating drill bit 8. This weight is exerted by heavy sections of drill pipe called drill collars 6. When a preselected weight of drill collars 6 have been attached to the drill string, the downward weight of the additional drill pipe sections 4 on drill bit 8 is concelled by lifting upwardly on the drill string with hook 66, leaving only drill collars 6 in compression and exerting a preselected constant weight on the bit 8. As each additional drill pipe section 4 is added, the tension on cable 64 is increased, exerting tension on hook 66, kelly joint 30 and the drill pipe sections 4. The load on cable 64 is conventionally measured by a pressure detecting means (not shown) which measures the load on cable 64. Pressure variation related to the load on cable 64, including the weight of traveling block 62, hook 66, swivel 28, kelly joint 30 and drill pipe 4, are communicated by way of tubing 68 to the recording device 52 where they are indicated by a continuous log trace. This measurement of the load on cable 64 necessary to offset the weight of the drill string except for the drill collars 6 and bit 8 is known as "hookload."

As hereinbefore stated, applicant has discovered that the decrease in differential pressure exerted at the bottom of a borehole during drilling is functionally related to the magnitude of change in the actual rate of penetration of the drill bit from an expected rate through shale indicator formations. Further, applicant has discovered an empirical quantitative relationship between changes in differential pressure and changes in rate of penetration through these indicator formations.

Referring again to FIG. 1, there may be seen illustrated a typical shale indicator formation 70 overlying an abnormally high-pressured formation as hereinbefore described. Ordinarily, since the hydrostatic pressure of the mud is increased faster with depth than is the pore pressure of such indicator formations, the differential pressure at the bottom of the borehole is increasing regularly with depth, provided of course, that the mud pressure and formation pore pressure gradients remain constant. With the differential pressure increasing, the rate of penetration through such shale indicator formations will exhibit a constant rate of decrease with depth due to the reverse effect of "self chipping" as hereinbefore described. This phenomena will hold true for the first penetration of drill bit 8 through formation 70 until drill bit 8 enters the higher pressured (increased pore pressure gradient) zone 72 that overlies the abnormally high-pressured formation 74. When bit 8 enters zone 72, the increased pore pressure will lower the bottomhole differential pressure and the drill bit rate of penetration will increase due to the "self chipping" effect. It is this increase in rate of penetration through an indicator formation, or through successive indicator formations, that signals an increase in pore pressure at the bottom of the borehole with a corresponding decrease in differential pressure.

Referring now to FIG. 2, the direct relationship between increases in drilling rate of penetration through indicator formations and decreases in bottomhole differential pressure is graphically displayed by curves A, B and C. Each curve represents the relationship for a differing gradient of pore pressure for indicator formations tested.

FIG. 3 shows a section of a typical strip chart recorder log from recording device 52 shown in FIG. 1. On the left-hand vertical side of the log can be seen a vertical scale for measuring borehole depth in twenty-foot increments. A horizontal scale, reading from left to right across the log, indicates time in increments of one hour. The second horizontal scale indicates rate of penetration (ROP) in feet per hour in 30 ft./hr. increments. Hookload is indicated at the top of the log in pounds at 50,000 lb. intervals.

In FIG. 3 is shown a time trace 75, hookload trace 76, and rate of penetration trace 77. Time trace 75 is shown as it varies from left to right in tracing five-hour sequences of time. For example the total drilling time elapsed in drilling from 10,040 feet to 10,185 feet is five hours. Similarly, another five-hour interval has elapsed in drilling from 10,185 feet to 10,315 feet. The steps in the time trace are caused when the drilling operation halts for short periods, such as when a new drill pipe section is added to the drill string. A longer step would be shown when a long interval occurs as when the drill string is removed for replacing a drill bit or to make logging measurements or perform other operations downhole. Hookload trace 76 is shown as it varies with depth. The hookload, of course, increases as new pipe sections are added to the drill string.

Rate of penetration trace 77 shows the downward progress of the drill bit through subterranean formations. The ROP varies, increasing and decreasing depending on the type of formation penetrated. Shale formations are recognizable as the slowest ROP peaks indicated generally at 78. Less compacted formations are penetrated faster and are shown as the fastest ROP peaks 79. It can be seen that the shale formation peaks 78 are generally moving to the left as depth increases (i.e., ROP is decreasing through successive shale formations as depth increases) in the depth span from 10,000 feet to 10,180 feet. This is a natural phenomena and is caused by the increase in bottomhole differential pressure as depth increases as hereinbefore described. However, after 10,180 feet it can be seen that successive shale formation peaks begin to move generally to the right during the interval from 10,200 feet to 10,260 feet, indicating an increased ROP through successive shale indicator formations.

Referring now to FIG. 4, time trace 75, hookload trace 76, and ROP trace 77 are shown for the same interval of the sample log as depicted in FIG. 3. A shale baseline 80 is derived to depict the linear rate of ROP decrease through successive shale formations at increased depths as indicated by peaks 78. It can be seen that for the depth interval from 10,000 feet to 10,180 feet the ROP is decreasing. Baseline 80 is an indication of the expected ROP decrease through the shale indicator formations as depth increases. As hereinbefore stated, the shale ROP peaks 78 begin to show an increase in ROP at depths below 10,200 feet. A second shale baseline 81 is derived to depict the actual rate of ROP increase through successive shale formations as indicated by peaks 78 below a depth of 10,180 feet shown as point A. At depths below 10,260 feet, it can be seen that the shale formation peaks 78 again indicate a decreasing ROP with increased depth. A third shale baseline 86 is derived to depict the expected declining ROP at depths below 10,260 feet. The deviations in the shale baselines at points A and E are due to changes in formation pore pressure.

A derived line 82 can be seen intersecting baselines 80 and 81 and time trace 75, the latter at point C, at a depth of 10,230 feet indicated by point B. The magnitude of deviation between the expected ROP as indicated by baseline 80 and the actual ROP as indicated by baseline 81 at a depth as shown by point B of 10,230 feet is shown as interval 83. Another line 84 is shown derived as an extension of one segment of time trace 75. A third line 85 derived at a depth of 10,258 feet intersects the extended time trace as represented by line 84 at point D. At point E the ROP begins to decrease relative to the rate shown by baseline 81 and is indicated at subsequent depths by baseline 86. The magnitude of deviation between the expected ROP as indicated by baseline 80 and the actual ROP at point E is shown as interval 87.

Referring now to FIG. 14 a graph depicting the change in ROP as indicated by shale baselines 80, 81 and 86 is shown with corresponding curves representing hydrostatic pressure and formation pore pressure associated with the changes in ROP as curves 90 and 92 respectively. As can be seen, the bottomhole pressure differential is the difference between the hydrostatic pressure curve 90 and the formation pore pressure curve 92. It can further be seen that the differential pressure is increasing with increased depth since the hydrostatic pressure is increasing at a faster rate than the formation pore pressure.

As hereinbefore stated, baseline 80 reflects the expected declining ROP of the drill through successive shale indicator formations. Baseline 81 reflects an actual ROP increasing relative to the expected ROP indicated by baseline 80. The intersection of baselines 80 and 81 is at point A, indicating the point at which the ROP commenced to increase over the expected rate. From the depth scale it can be seen that the deviation occurs at a first depth of 10,180 feet. The bottomhole differential pressure at 10,180 feet is approximately 550 p.s.i. as measured between point S on curve 90 and point T on curve 92.

At a second selected depth of 10,230 feet, the differential pressure can be seen to have decreased to a magnitude of approximately 200 p.s.i. as measured between points U and V on curves 90 and 92, respectively. The decrease in differential pressure at 10,230 feet has been discovered to be due to a sudden increasing rate of formation pore pressure. The interval represented by W is the expected bottomhole pressure differential at a depth of 10,230 feet based on the expected hydrostatic and formation pore pressures as shown by curves 90 and 92, respectively. If drilling mud density is increased at depths below 10,230 feet, curve 90 will indicate an increasing hydrostatic pressure at depths below point U. As can be seen, the increase in hydrostatic pressure causes increase in bottomhole differential pressure thus preventing a possible blowout from occuring at a depth of 10,258 feet as shown at point Z where the formation pore pressure curve 92 and the hydrostatic pressure curve 90 would have intersected if a mud density increase had not been effected.

Curve 92 changes slope at point Y indicating a change in formation pore pressures from a rapidly increasing rate to a constant increasing rate with increased depth. The bottom-hole differential pressure measured between points X and Y on curves 90 and 92, respectively, is approximately 190 p.s.i. if the drilling mud density is maintained constant below that depth the hydrostatic pressure curve at depths below point X will again show a linear increase with increased depth. The formation pore pressure curve 92 reflects the change in formation pore pressures below the depth indicated at Y and the bottomhole differential pressure can be seen to increase with increased depth below 10,260 feet.

The increases in bottomhole differential pressures below 10,260 feet are reflected by the change in ROP indicated by shale baseline 86. As the pressure differential increases the ROP begins to decrease with increased depths below point E at 10,260 feet. The ROP can be expected to follow shale baseline 86 at a declining rate until another abnormally high-pressured formation is encountered.

The above discussed correlation of hydrostatic pressure and formation pore pressure resulting in changes of bottomhole pressure differential as reflected by ROP trace 77 in FIG. 4 is an analysis utilizing normalized parameters of the drilling operation. It is suggested that hookload as represented by trace 76 of FIG. 4 and the mud pump pressure as read by indicator 20 of pump 18 and drill bit r.p.m. as read by meter 48 of motor 44 as shown in FIG. 1 be held substantially constant to achieve most accurate results.

Referring again to FIG. 4, if a depth of 10,230 feet has just been reached, confirming the increasing ROP through shale formations between points A and B as indicated by peaks 78, baseline 81 may be derived and it will intersect baseline 80 at point A. The magnitude of deviation between the baselines 80 and 81 is reflected by interval 83 and is a measure of the magnitude of increase in actual ROP over the expected ROP at depth B.

As hereinbefore stated, applicant has discovered a direct relationship between a quantitative increase in the rate of penetration of the drill bit through shale indicator formations and the magnitude of decrease in bottom hole differential pressure. Knowing the quantitative ROP decrease through an indicator formation at a known depth, the magnitude of decrease in bottomhole differential pressure ($P_d$) is obtained by the following equation:

$$P_d = k(R) \qquad (1)$$

where $k$ is an empirical constant depending on the geological type of indicator formation being utilized; an R is the magnitude of ROP increase as measured by the deviation between baselines 80 and 81 by interval 83 in FIG. 4.

Once the quantitative decrease in the differential pressure is known, the absolute differential pressure ($P_a$) can be derived by the following equation:

$$P_a = P_e - P_d \qquad (2)$$

where $P_e$ is the expected differential pressure hereinbefore defined as interval W of FIG. 14; and $P_d$ is the magnitude decrease in differential pressure obtained in Formula 1.

Since the expected differential pressure ($P_e$) is a measure of the expected pressure differential at the bottom of the borehole, it can be derived by the following equation:

$$P_e = G_m d - G_f d \text{ or}$$
$$= (G_m - G_f) d \qquad (3)$$

where $G_m$ is the pressure gradient corresponding to the density of the drilling mud; $G_f$ is the predicted formation pore pressure gradient of the shale formations; $d$ is the bottomhole depth in feet; $G_m d$ is the hydrostatic pressure of the column of drilling mud at depth $d$; and $G_f d$ is the formation pore pressure at depth $d$.

Substituting Equations 1 and 3 into Equation 2 the actual bottomhole pressure differential can be derived as follows:

$$P_a = (G_m - G_f) d - k(R) \qquad (4)$$

As can be seen by referring to FIGS. 4 and 14, the actual bottomhole pressure differential at a depth of 10,230 feet shows a substantial decrease from the expected differential pressure. To calculate the depth at which the formation pore pressure curve 92 will intersect the hydrostatic pressure curve 90, resulting in a zero bottomhole pressure differential at point Z, the following equation may be used to first determine the rate of loss of differential pressure:

$$L = \frac{P_d}{D} \qquad (5)$$

where $P_d$ is the magnitude of decrease in bottomhole differential pressure and D is the depth interval between points A and B in FIG. 4.

The depth interval (D) used in Equation 5 is obtained by scaling the depth interval from the point at which expected shale baselines 80 and 81 intersect, shown as point A in FIG. 4, to point B at 10,230 ft. where the determination of pressures has occurred. As long the shale peaks 78 at increased depths continue to follow shale baseline 81, this rate of loss of differential pressure will remain constant.

The depth ($d_o$) where zero differential pressure will occur may now be derived by the following equation:

$$d_o = \frac{P_a}{L} + d \qquad (6)$$

where $P_a$ is the actual differential pressure previously obtained; L is the rate of loss of differential pressure; and $d$ is the bottomhole depth at which $P_a$ was derived.

The zero differential pressure depth is the depth at which control of the differential pressure may be lost and probably will result in a blowout of the well. Once the decrease in differential pressure is known, and the actual differential pressure has been determined, the drilling engineer generally must make immediate decisions as to how to control the decreasing bottomhole differential pressures as drilling progresses. Assuming that a minimum differential pressure of 300 p.s.i. is desired, the actual differential pressure at a depth of 10,230 feet is already 100 p.s.i. below the minimum (assuming the actual differential pressure is 200 p.s.i. as determined in FIG. 14), necessitating immediate action. To restore the bottomhole pressure to its minimum value, the drilling engineer could close the choke on the mud outflow from the casing annulus to create a back pressure of at least 100 p.s.i. Of course, increasing the back pressure is a temporary expedient to prevent losing bottomhole pressure differential control and the drilling engineer will probably want to increase the mud density a sufficient amount to increase the mud pressure gradient and hence the hydrostatic pressure to insure the desired minimum differential pressure. The corrected mud density (W) may be determined according to the following equation:

$$W = \frac{\frac{P_o - P_a}{d} + G_m}{0.052} \quad (7)$$

where $P_o$ is the predetermined differential pressure level desired to be maintained; $P_a$ is the actual pressure differential; $d$ is the bottomhole depth; $G_m$ is the existing pressure gradient of the drilling mud; and 0.052 is a factor to convert drilling mud pressure gradient to density in lbs./gal.

Referring to FIG. 4, the time period available for drilling mud "weight-up" can be determined as the time interval between points C and D on time trace 75. Point C is the point on time trace 75 where the bottomhole pressure differential determinations were made and line 85 is derived at the zero differential pressure depth as would be determined using Equations 5 and 6. Time trace 75 is extended as line 84 since no trace would appear for depths below 10,230 feet at the time when the measurement of ROP increase was made. The scaled time interval between points C and D will yield the predicted time to reach the depth of zero pressure differential, approximately one hour as seen in FIG. 4.

If mud "weight-up" is begun immediately at a depth of 10,230 feet, the hydrostatic pressure curve 90, as seen in FIG. 14, will show an increase. Of course, mud density cannot be changed instantaneously and often requires several hours. This gradual increase in drilling mud density is shown by the portion of curve 90 between points U and X where the hydrostatic pressure rapidly increases. As the bottomhole differential pressure increases due to the increase in hydrostatic pressure the ROP through the shale indicator formations will decrease as shown by baseline 86. Of course baselines 81 and 86 are derived along the shale peaks 78 of the ROP log trace 77 and are idealized conditions. The actual ROP baseline for the decrease in ROP exhibited below 10,230 feet is due to the mud density increase and a decrease in the rate of increase of formation pore pressure may generally be shown as a dotted line 88 in FIG. 14.

When the shale peaks 78 below a depth of 10,260 feet are noticed to have a decreasing ROP trend, as seen in FIG. 4, baseline 86 would be derived as hereinbefore mentioned. As seen in FIG. 14, the pressure differential below the depth corresponding to point E is increasing. The danger of a blowout may be past, but the drilling engineer will now be interested in knowing the actual pressure differential at that depth. By utilizing Equation 4 and measuring the magnitude of the deviation of the actual rate of penetration at point E from the expected rate of penetration at the same depth as represented by interval 87, the actual bottomhole pressure differential can be determined. If the actual pressure differential is below the desired minimum, then a corrected mud density can be derived according to Equation 7.

Since line 86 reflects a new expected declining ROP baseline for shale formations below the depth indicated by point E, and it can be seen from FIG. 14 that formation pore pressures are no longer following the original predicted pore pressure gradient, it can be helpful to derive an expected pore pressure gradient for depths below that indicated by point E. The expected formation pore pressure ($G_F$) may be derived according to the following equation:

$$G_F = \frac{G_t d + P_d}{d}$$

or $$= G_t + \frac{P_d}{d} \quad (8)$$

where $G_t$ is the predicted formation pore pressure gradient; $d$ is bottomhole depth at point E in FIG. 4; and $P_d$ is the magnitude of decrease in bottomhole differential pressure related to the magnitude of ROP increase.

By substituting from Equation 1 into Equation 8:

$$G_F = G_t + \frac{k(R)}{d} \quad (9)$$

If the actual ROP increases at a subsequent depth, and it is desired to derive the actual pressure differential at some subsequent depth, the expected port pressure gradient ($G_F$) would be used in Equations 3 and 4 in place of the original predicted port pressure gradient ($G_t$).

Referring now to FIG. 5, a nomograph for deriving the actual pressure differential as a function of the change in ROP is shown. The nomograph has a first scale for indicating the mud pressure gradient, a second scale, parallel to the first, for indicating the formation pore pressure gradient, and a third scale parallel to the second scale, for plotting the difference in gradients. A straight line intersects the first scale at point A, the second scale at point B and the third scale at point C. From the zero of the third scale are a predetermined number of diverging rays spaced at preselected intervals to form a fourth scale representative of borehole depth. A straight line, perpendicular to the third scale intersects the third scale at point C and the fourth scale at a selected depth, represented by point D. A fifth scale, perpendicular to the third scale indicates the magnitude of the expected pressure differential. A straight line parallel to the third scale intersects the fifth scale perpendicularly at point E and the fourth scale at D.

A sixth scale parallel to the fifth scale indicates the magnitude of actual ROP increase over the expected ROP. A seventh scale parallel to the sixth scale and positioned between the fifth and sixth scales indicates pressure differential decrease. A straight line perpendicular to the sixth and seventh scales intersects them at points F and G respectively. An eighth scale, parallel to the fifth and seventh scales, and positioned therebetween indicates the actual bottomhole pressure differential at a point H intersected by a straight line connecting points E and G on the fifth and seventh scales, respectively.

Referring to FIG. 4, the magnitude of deviation of the actual ROP over the expected ROP as indicated by interval 83 or 87 is plotted on the sixth scale of the nomograph with interval 83 being shown at point F. A perpendicular line intersecting point F intersects the seventh scale at point G indicating a measurement of the quantitative decrease in bottomhole differential pressure of approximately 360 p.s.i. The sixth and seventh scales accomplish the derivation of pressure differential decrease as shown in Equation 1.

To determine the expected bottomhole differential pressure according to Equation 4, the mud pressure gradient is plotted at point A on the first scale for a typical value of 0.52 p.s.i./ft. corresponding to a 10 lb./gal. mud density. A typical pore pressure gradient of 0.465 p.s.i./ft. is plotted on the second scale at point B. A straight line defined by points A and B intersects the third scale at point C and indicates a 0.055 p.s.i./ft. gradient difference. A straight line is plotted, perpendicular to the third scale and intersecting the fourth scale at a point D, corresponding to the depth at which Equation 4 is to be solved. This depth can correspond to the depth at either point B or point E in FIG. 4. Assuming that the depth at point B is of interest, point D will be located at 10,230 ft. A straight line constructed from point D to perpendicularly intersect the fifth scale will provide a measure of the expected bottomhole pressure differential at point E and functionally represents the product of the gradient difference at point C on the third scale and the borehole depth at point D on the fourth scale. A straight line defined by points E and G intersect the eighth scale at point H and functionally represents the difference between the expected pressure differential and the magnitude of decrease in differential pressure for a value of approximately 200 p.s.i. which represents the actual bottomhole pressure differential derived by Equation 4.

Figure 6:
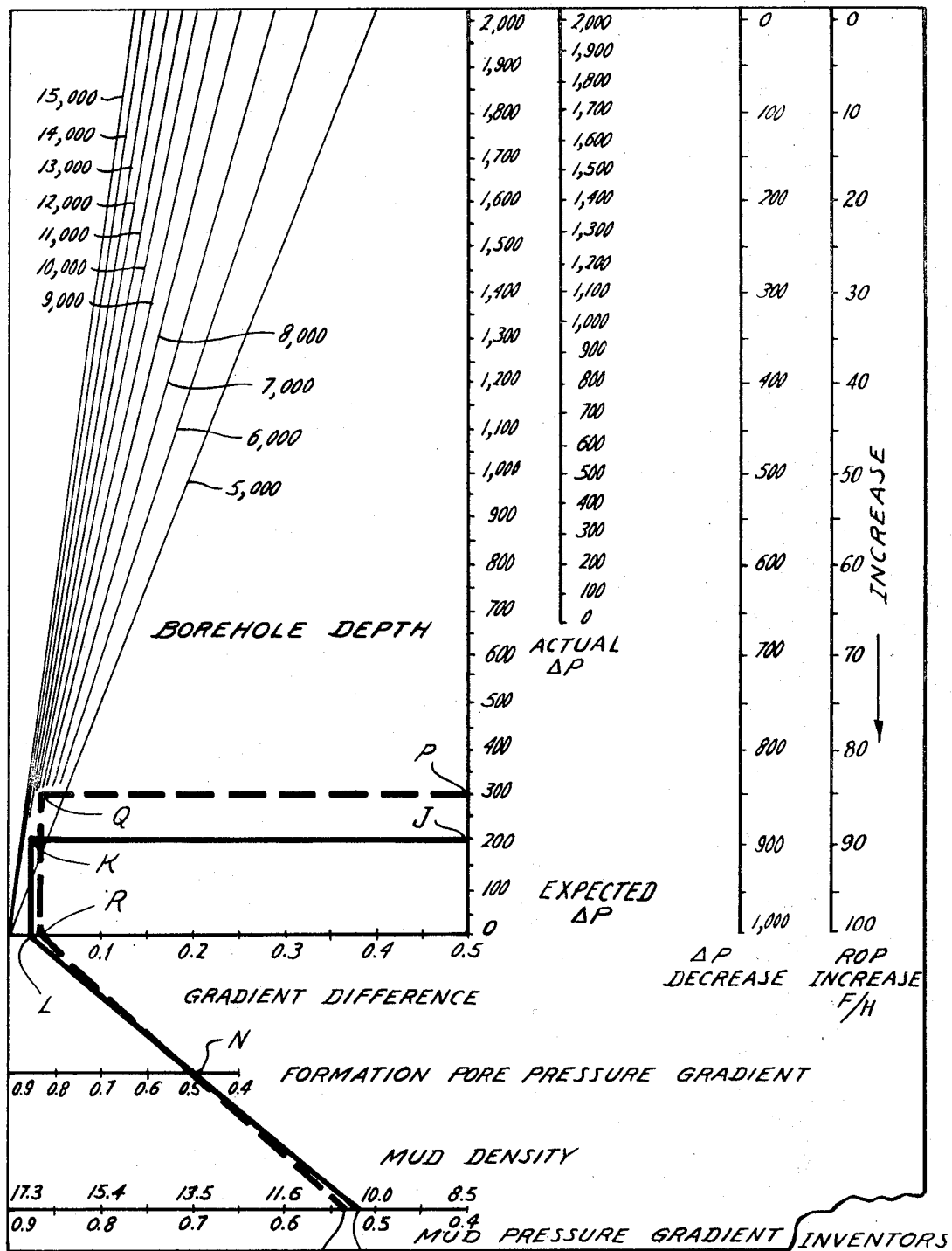
FIG. 6 is an illustration of how the nomograph shown in FIG. 5 may be used to determine a corrected formation pore pressure gradient and a new drilling mud density.

Referring now to FIG. 6, the same nomograph of FIG. 5 is illustrated and its use to derive a corrected formation pore pressure gradient and a corrected mud density are shown. A solid straight line perpendicular to the fifth scale is shown intersecting the fifth scale at point J and intersecting the fourth scale at point K. A straight line perpendicular to the third scale and intersecting point K intersects the third scale at point L. A straight line defined by points L and M, the latter plotted on the first scale, intersects the second scale at point N indicating a new formation pore pressure gradient.

A dotted straight line perpendicular to the fifth scale is shown intersecting it at point P and intersecting the fourth scale at point Q. A straight line perpendicular to the third scale and intersecting point Q intersects the third scale at point R. A straight line defined by points R and N on the third and second scales, respectively, intersects the first scale at point S, indicating a corrected mud pressure gradient and mud density.

If the actual bottomhole pressure differential has been derived and it has been determined that an increase in mud density is necessary to achieve a minimum pressure differential, the corrected mud density may be derived by use of the first, second, third, fourth and fifth scales of the nomograph hereinbefore descirbed in FIG. 5. Assuming the actual pressure differential is 200 p.s.i. as previously derived in FIG. 5, that value is entered on the fifth scale at point J. A solid straight line is constructed perpendicular to the fifth scale and intersects the fourth scale at the bottomhole depth of interest at point K. By constructing a line through point K to perpendicuuarly intersect the third scale at L, the gradient difference between the actual mud pressure and the increased formation pore pressure is derived. If point K is 10,230 feet the gradient difference as indicated by the third scale will be approximately 0.02 p.s.i./ft. at point L. Assuming that the mud pressure gradient is 0.52 p.s.i./ft. as hereinbefore mentioned, a straight line defined by points L and M, the latter indicating the mud pressure gradient on the first scale, will yield a value of 0.50 p.s.i./ft. at point N on the second scale. Point N provides a measure of the corrected formation pore pressure gradient.

To derive the corrected mud pressure gradient and correct mud density, the fifth scale is entered at point P corresponding to the minimum bottomhole pressure differential desired to be maintained. For example purposes, 300 p.s.i. has been selected as the minimum bottomhole differential pressure. In FIG. 6, a dotted straight line is constructed perpendicular to the fifth scale and intersects the fourth scale at the bottomhole depth of interest at point Q. By constructing a line through point Q to perpendicularly intersect the third scale at R, the gradient difference between the corrected mud pressure and the corrected formation pore pressure is derived. If point Q is 10,230 feet the gradient difference as indicated by the third scale will be approximately 0.020 p.s.i./ft. at point R. A straight line defined by points R and N, the latter, the same point previously derived as the corrected formation pore pressure gradient, will intersect the first scale at point S indicating a corrected mud density of 10.2 lbs./gal. that will provide a 300 p.s.i. bottomhole pressure differential at a depth of 10,230 feet. Appropriate mud "weight-up" measures can now be effected to change in the mud density.

Figure 7:
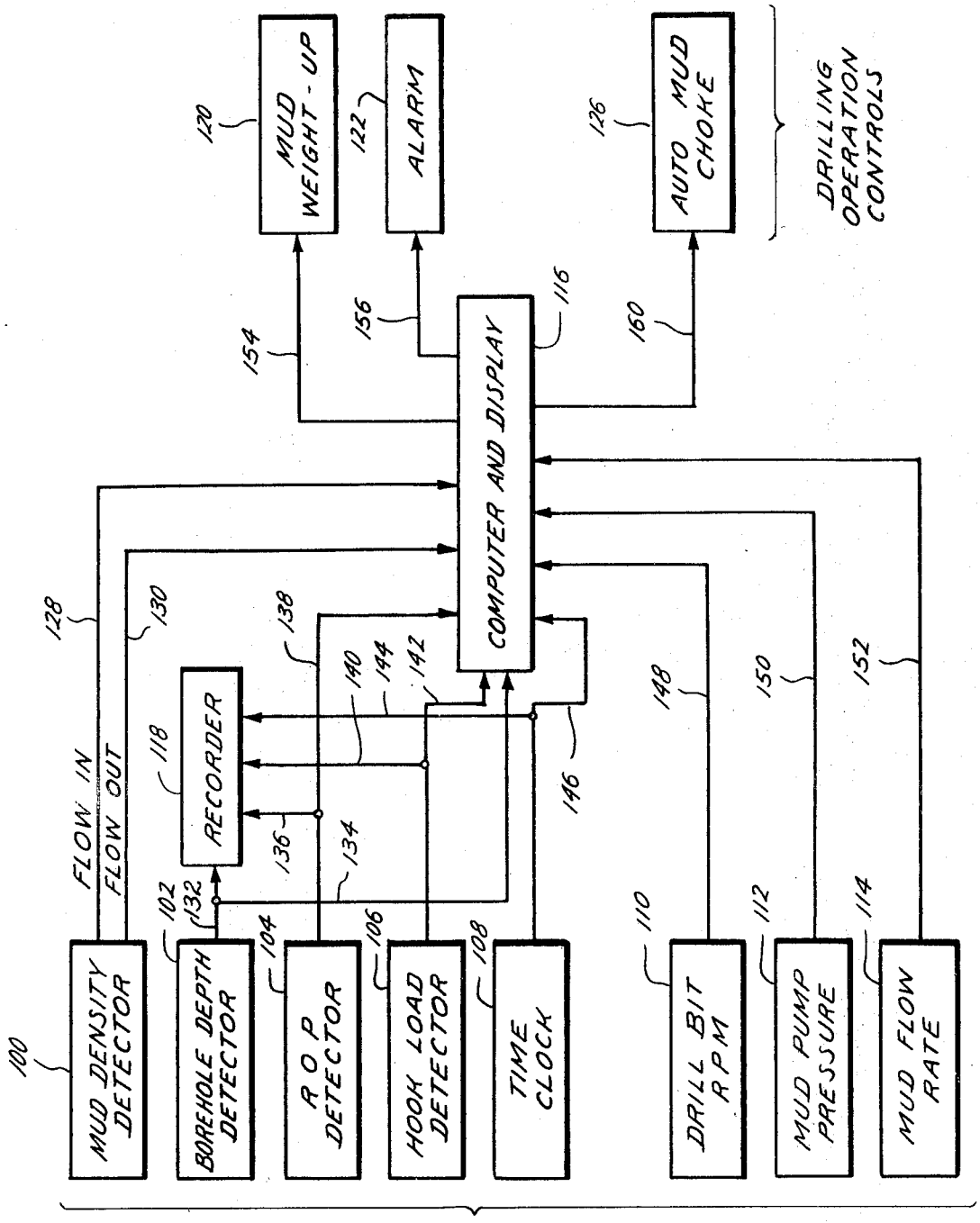
FIG. 7 is a functional illustration of one form of apparatus capable of determining bottomhole differential pressure and controlling selected drilling functions according to the present invention.

Referring now to FIG. 7, a functional diagram is shown of one embodiment of an automated system apparatus for determining the change in differential and controlling selected drilling operation functions including major components of the system. Selected drilling functions are measured, recorded and applied to a computer and display device where control signals for certain drilling operation functions are generated.

Mud density detectors 100 measure the density of the drilling mud pumped into the borehole and the density of the mud flowing out of the annulus between the drill string and casing after it returns from the bottom of the borehole. Signals representative of mud density for flow into and out of the borehole are applied via conductors 128 and 130, respectively, as inputs to computer and display device 116. Borehole depth detector 102 measures borehole depth and applied an analog signal representative of depth to recorder 118 via conductor 132 and as another input to computer and display device (CD device) 116 via conductor 134. Rate of penetration of the drill bit is measured by ROP detector 104 and an electrical output signal representative thereof is applied via conductor 136 to recorder 118 and via conductor 138 as an input to CD device 116. Similarly, hookload and time are measured by hookload detector 106 and clock 108, and applied via conductors 140 and 144 to recorder 118, and via conductors 142 and 146 to CD device 116, respectively. Drill bit r.p.m., mud pump pressure and mud flow rate are measured by detectors 110, 112 and 114, respectively, and applied directly as inputs to CD device 116 via conductors 148, 50 and 152, respectively.

Computer and display device 116 determines a decrease in differential pressure functionally related to a measured increase in ROP through shale indicator formations, the actual bottomhole pressure differential, zero pressure differential depth, expected formation pore pressure gradient and the corrected mud weight needed to maintain a minimum differential pressure level. Further, an alarm control signal is generated when an ROP increase signal is generated and is applied via conductor 156 to alarm 122. A control signal for the corrected mud weight is generated and applied through conductor 154 to a mud weight-up device 120. A control signal for regulating an automatic mud choke device 126 is applied via conductor 160.

Recorder 118 can be any conventional recording means, but is preferably a strip chart recorder providing visual traces of time, ROP, borehole depth and hookload on a continuous graphical log. The detectors can be any conventional equipment that provides an analog output signal functionally related to the parameter being detected and measured.

Figure 8:
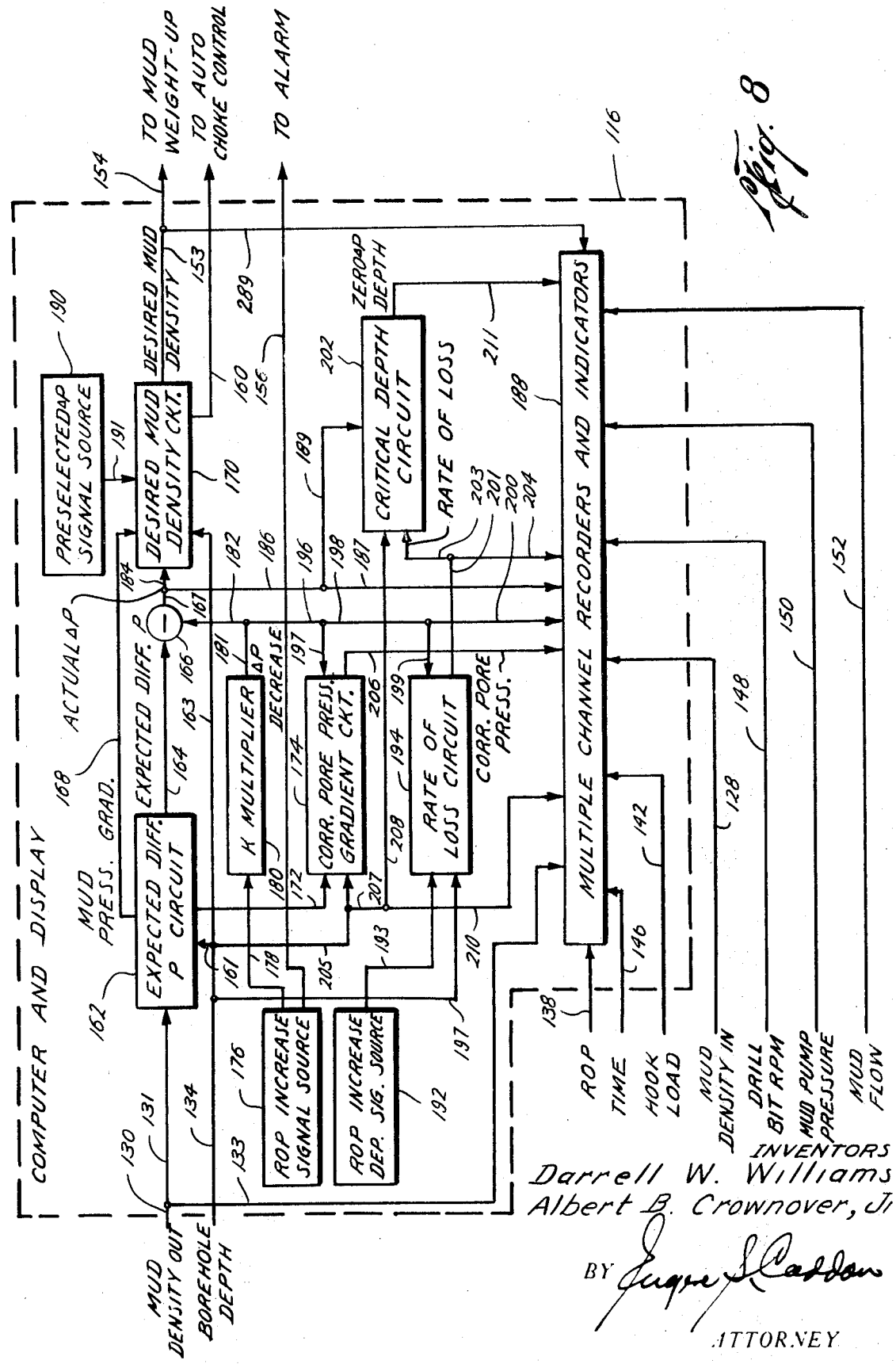
FIG. 8 is a detailed functional illustration of a portion of the apparatus shown in FIG. 7.

Referring now to FIG. 8, greater detail of the functional operation of computer and display device 116 can be seen. A mud density "out" signal from detector 100 is applied via conductors 130 and 131 to one input of expected bottomhole differential pressure circuit 162. Borehole depth is applied to the other input of circuit 162 through conductors 134 and 161. The output of circuit 162 is a signal representative of expected bottomhole pressure differential and is applied through conductor 164 to a conventional subtracting circuit 166. Mud pressure gradient signals are applied via conductor 168 as one input to desired mud density circuit 170. An initial formation pore pressure gradient signal is transmitted through conductor 172 to one input of expected formation pore pressure gradient circuit 174.

ROP increase signal source 176 may conveniently include a rotary switch into which the quantitative value of the ROP increase can be applied to the input of $k$ multiplier circuit 180 via conductor 178. ROP increase signal source 176 also applies an alarm control signal to appropriate alarm equipment via conductor 156. The $k$ multiplier circuit 180 is a conventional analog circuit capable of multiplication by a constant. In this case the constant is the value of the empirical constant $k$. This value may be any constant value, depending on the geological type of indicator formation selected.

The signal output of $k$ multiplier 180, representing the magnitude of pressure differential decrease, is applied via conductors 181 and 182 as the other input to the conventional analog subtracting circuit 166. The difference output of subtracting circuit 166, actual bottomhole pressure differential, is applied as another input to desired mud density circuit 170 through conductors 167 and 184. The actual pressure differential output signal is also applied via conductors 167, 186 and 187 as one input to multiple channel recording and indicating (MCRI) device 188.

Preselected pressure differential signal source 190 applies a predetermined minimum pressure differential level signal as a third input to circuit 170 via conductor 191. Borehole depth is applied via conductors 134 and 163 as a fourth input to circuit 170. The outputs of desired mud density circuit 170 are applied as control signals to the mud weight-up equipment and automatic choke via conductors 154 and 160, respectively. Desired mud density is also appplied via conductors 153 and 289 as another input to MCRI 188.

An ROP increase depth signal source 192 applies an analog signal indicative of the depth interval, as shown in FIG. 4, between points A and B, via conductor 193 as one input to rate of loss (ROL) circuit 194. Borehole depth signals via conductors 134 and 197 are applied as a second input to ROL circuit 194. A pressure differential decrease signal is also applied from $k$ multiplier 180 via conductors 181, 196, 198 and 199 as a third input to ROL circuit 194. The pressure differential loss per foot output of ROL circuit 194 is applied to one input of critical depth circuit 202 via conductors 201 and 203, and to another input of MCRI device 188 via conductors 201 and 204.

Borehole depth signals are further applied through conductors 134, 205, 207 and 208 to the second input of critical depth circuit 202, and via 134, 205, 207 and 210 as an input to MCRI 188. The third input of critical depth circuit 202 is actual differential pressure via conductors 167, 186 and 289. The output of circuit 202 is zero pressure differential depth applied via conductor 211 to another channel of MCRI 188.

Borehole depth signals are also applied via conductors 134 and 205 as a second input to corrected formation pore pressure gradient (PPG) circuit 174. A third input to PPG circuit 174 is the pressure differential decrease output signal of $k$ multiplier 180 applied through conductors 181, 196 and 197. The corrected pore pressure gradient output signal of PPG circuit 174 is transmitted via conductor 206 to one channel of MCRI 188.

The mud density "out" signal, hereinbefore mentioned, is also applied via conductors 130 and 133 to one channel of MCRI 188. Signals representing ROP, time and hookload are also applied to individual channels of MCRI 188 via conductors 138, 146 and 142, respectively. In addition, signals transmitted from detectors measuring mud density "in," drill bit r.p.m., mud pump pressure and mud flow rate are applied to respective MCRI 188 channels through conductors 128, 148, 150 and 152.

Signal sources 176, 190 and 192 can conveniently be any conventional device for entering the required signal into the circuitry either manually or automatically. If manual, the desired parameters are plotted from the visual log of recorder 118 (FIG. 7) as hereinbefore described for the typical log shown in FIG. 4.

MCRI equipment 188 may be a console type device having recording and indicating means available to record and indicate on separate channels the signals representing drilling operation and pressure differential derivations monitored. The recording means may be circular or strip chart recorders for providing a visual record, and/or magnetic tape recorders that may be used for further study and analysis. The indicating means may be a combination of visual graph or chart recording and appropriate meter or register devices for visually indicating the magnitude of the parameters detected, or it may be the visual indicating equipment alone. Preferably, the recording equipment will be graphical or chart recorders with an auxiliary magnetic tape recorder for recording all measured functions. The indicating means preferably are visual counters or registers to give the drilling engineer precise indications of measured parameters.

Figure 9:
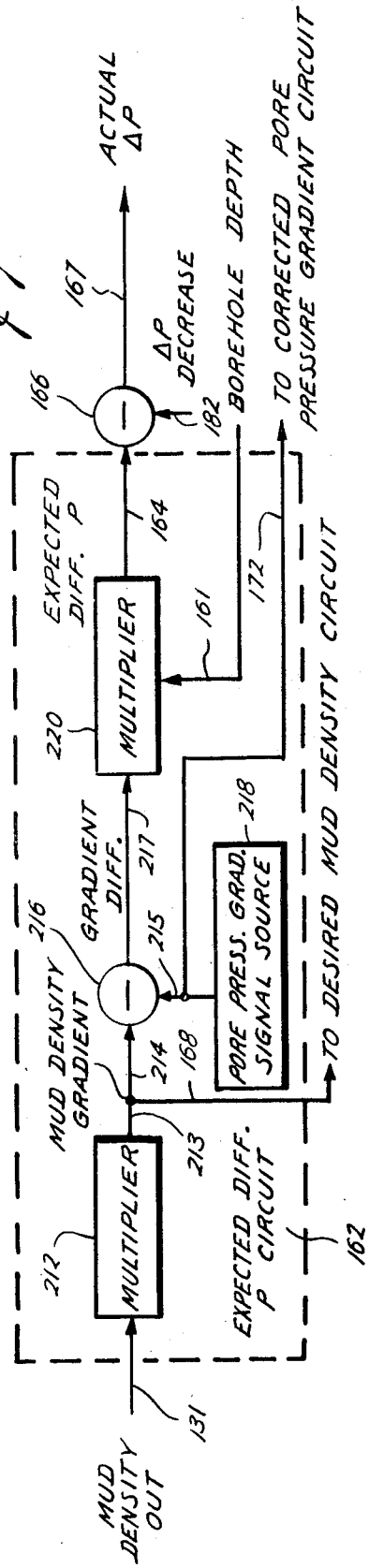
FIG. 9 is a detailed functional diagram of a portion of the apparatus generally shown in FIG. 8.

Expected bottomhole pressure differential circuit 162 is shown in greater detail in FIG. 9. The mud density "out" signal is applied to the input of a conventional analog multiplier circuit 212 through input conductor 131. The mud density "out" signal is an analog representation of the mud density in lbs./gal. and multiplier 212 multiplies this signal by a constant value of 0.052 to produce an analog output signal representative of the mud pressure gradient applied via conductors 213 and 214 as one input to a conventional subtracting circuit 216. The other input signal to subtracting circuit 216 is transmitted via conductor 215 from pore pressure gradient signal source 218. Source 218 may be any convenient means for inserting the appropriate formation pore pressure gradient into the circuit. The gradient may be pre-recorded and selected for the well being drilled based on the experience with the class of indicator formations being penetrated, or it may be any conventional means of inserting the appropriate value via an electric signal such as a rotary switch encoder.

The gradient difference output of subtracting circuit 216 is applied through conductor 217 as one input to a conventional multiplier circuit 220. Circuit 220 may conveniently be an analog servomultiplier that is commonly used to multiply two variables. The second input to multiplier circuit 220 is a borehole depth signal via conductor 161. The product output of multiplier 220 is an expected bottomhole differential pressure signal applied through conductor 164 to another conventional analog subtracting circuit 166. The function of subtracting circuit 166 is to produce a difference signal indicative of the quantitative difference between the expected pressure differential and the magnitude of pressure differential decrease, applied to circuit 166 via conductor 182, as an actual pressure differential signal applied out through conductor 167.

Figure 10:
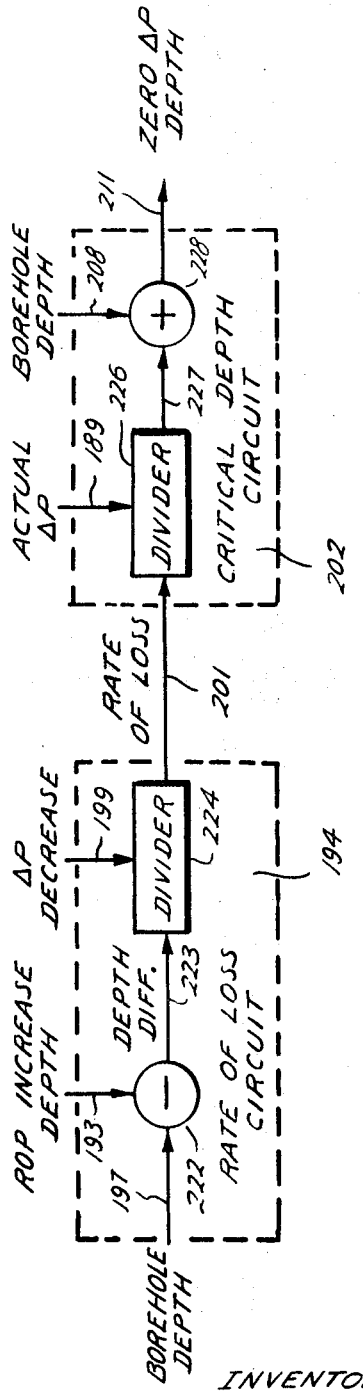
FIG. 10 is a detailed functional diagram of another portion of the apparatus generally shown in FIG. 8.

Referring now to FIG. 10, a detailed functional diagram of one embodiment of ROL circuit 194 and critical depth circuit 202, shown generally in FIG. 8, can be seen. Borehole depth signals are applied via conductor 197 to one input of a conventional subtracting circuit 222. An ROP increase depth signal via conductor 193 is applied as the other input to subtracting circuit 222. The depth difference signal output of circuit 222 is transmitted through conductor 223 as one input to a conventional analog divider circuit 224. Circuit 224 may conveniently be an analog servodivider commonly used to divide by two variables. The second input to divider 224 is a signal representative of pressure differential decrease applied through conductor 199. The output of divider 224 is an analog signal representative of the pressure differential rate of loss per foot of increasing depth. This signal is applied via conductor 201 to one input of a conventional analog dividing circuit 226 of the critical depth circuit 202. Divider 226 may also conveniently be an analog servodivider commonly used to divide by two variables. An actual differential pressure signal is applied through conductor 189 as the second input to divider 226. The output of divider 226 is applied via conductor 227 to an input of conventional analog adding circuit 228. Borehole depth as an analog signal is applied via conductor 208 to another input of adding circuit 228. The summed output signal of circuit 228 is representative of zero differential pressure depth and applied to MCRI 188 via conductor 211.

FIG. 11 shows one embodiment of desired mud weight circuit 170. A preselected minimum pressure differential signal is applied via conductor 191 to one input of subtracting circuit 230. Circuit 230 may be any conventional analog substracting circuit. An actual differential pressure signal is applied via conductor 184 to a second input of subtracting circuit 230. The pressure differential output from substracting circuit 230 is transmitted through conductors 231 and 244 to one input of divider 232 which may conveniently be a conventional servodivider capable of dividing two variables. The pressure differential signal output of circuit 230 is also applied via conductors 231 and 160 as a control signal to an automatic choke device to control back pressure on the mud flowing out of the borehole and effect a temporary pressure differential increase until the mud density can be changed. The other input to divider 232 is a borehole depth signal applied via conductor 163. The output signal of divider 232 is a measure of the necessary increase in mud density gradient to achieve the desired preselected differential pressure level, and is applied through conductor 233 to one input of conventional summing circuit 234. The other input to summing circuit 234 is existing mud pressure gradient via conductor 168. The gradient sum output of adding circuit 234 is applied through conductor 235 to divider circuit 236. Divider 236 is a conventional analog circuit capable of dividing by a constant. In this application the constant is 0.052 and converts the mud pressure gradient signal into signal representative of a mud density in lbs./gal. The desired mud density signal output of divider 236 is applied via conductor 154 to appropriate mud "weight-up" control equipment.

A detailed functional diagram of the corrected pore pressure gradient circuit 174 is shown in FIG. 12. A pressure differential decrease signal via conductor 197 is applied to one input of a conventional dividing circuit 238. Divider 238 can be any analog circuit capable of dividing two variables. The second input to divider 238 is a borehole depth signal applied via conductor 205. The signal output of divider 238 is a gradient correction signal applied via conductor 239 to one input of a conventional adding 240. Initial pore pressure gradient signals are applied to a second input of adding circuit 240 via conductor 172. The summed output signal of adding circuit 240 is the corrected formation pore pressure gradient and is applied via conductor 206 to MCRI 188.

Referring now to FIG. 13, a functional diagram of another embodiment of the present invention with the computer and display equipment remote from the well drilling site in a centrally located monitoring station may be seen. Borehole depth detector 300 applies an output analog signal to recorder 316 via conductor 301 and to transmitting and receiving equipment 318 via conductor 335. Similarly, ROP detector 302, hookload detector 304 and the time clock 306 apply signals to recorder 316 via conductors 303, 305 and 307, respectively, and to transmitting and receiving equipment 318 via conductors 337, 339 and 341, respectively. Recorder 316 can be any conventional recording means, but is preferably a strip chart recorder providing visual traces of the time, ROP, hookload and borehole depth parameters as a continuous log.

Mud density detectors 308 provide an analog signal representative of the density of the mud flowing into the borehole and out of the borehole via conductors 331 and 333, respectively, the transmitting and receiving equipment 318. Similarly, drill bit r.p.m., mud pump pressure and mud flow rate is measured by detectors 310, 312 and 314, respectively, and apply output signals to transmitting and receiving equipment 318 via conductors 311, 313 and 315, respectively. All detectors may be any conventional equipment that provides an analog output signal in response to the function being detected and measured as previously discussed for the embodiment shown in FIG. 1.

The detected signal are appropriately coupled to radio wave modulating or mixing equipment within device 318, and transmitted via appropriate radio wave propagating means to transmitter and receiver equipment 328 at the central monitoring site where the signals from the measured drilling functions are detected and applied directly to computing and display equipment (CD equipment) 330 via eight signal channels. CD equipment 330 performs the same functions as earlier described for CD device 116 shown in FIG. 7. Equipment 330 applies three signals for drilling operation control directly to transmitting and receiving equipment 328 for transmitting to equipment 318 at the well site. The three drilling operation control signals are received, detected and applied via conductors 319, 321 and 325 to mud weight-up, alarm and automatic mud choke control equipment 320, 322, and 326, respectively.

Numerous variations and modifications may obviously be made in the apparatus herein described without departing from the present invention. Accordingly, it should be clearly understood that the forms of the invention described herein and shown in the figures of the accompanying drawings are illustrative only and are not intended to limit the scope of the invention.

What is claimed is:
1. In a system for monitoring bottomhole differential pressure in a borehole being drilled with a drill string and drill bit therein and with drilling mud being circulated therethrough, the combination comprising:
 first means for generating a first signal representative of the density of mud in said borehole;
 second means for sensing the depth of said borehole and generating a second signal representative of borehole depth;
 third means of generating a third signal representative of the increase in actual rate of penetration of said bit relative to the expected rate of penetration between a first depth and a lower second depth in said borehole;
 and, fourth means operably connected with said first, second and third means and responsive to said first, second and third signals and arranged for deriving a fourth signal indicative of actual bottomhole differential pressure at said second depth in said borehole.

2. The invention as claimed in claim 1 including:
 fifth means for generating a fifth signal representative of preselected differential pressure desired to be maintained in said borehole during drilling;
 and sixth means responsive to said fourth and fifth signals for deriving a sixth signal representative of the required density of drilling mud for maintaining said preselected differential pressure.

3. The invention as claimed in claim 1 including:
 means for generating a fifth signal representative of the distance between said first and second depths in said borehole;
 and, means responsive to said fourth and fifth signals for deriving a sixth signal indicating the expected borehole depth where the bottomhole differential will be reduced to zero when said actual rate of penetration is increasing with depth.

4. In a system for controlling the bottomhole pressure differential in a borehole during drilling operations with a drill bit, comprising:
 means for generating a first signal indicative of the depth of the borehole;
 means for generating a second signal indicative of the magnitude of the increase in actual rate of penetration of the drill bit relative to the expected rate of penetration between a first depth and a second lower depth in said borehole;

means for generating a third signal indicative of the density of drilling mud in said borehole; and means responsive to said first, second and third signals for deriving a fourth signal indicative of bottomhole differential pressure at said second depth in said borehole functionally related to the difference between said expected and actual rates of penetration of said bit at said second depth.

5. The apparatus as described in claim 4, wherein said means responsive to said first, second and third signals, comprises:

means for generating a fifth signal indicative of expected differential pressure at said second depth; and means responsive to said first, second, third and fifth signals for deriving said fourth signal.

6. The apparatus as described in claim 5, wherein said system further comprises:

means for generating a sixth signal indicative of a preselected differential pressure desired to be maintained in the borehole during the drilling operations; and means responsive to said first, fifth and sixth signals for deriving a seventh signal indicative of the required density of drilling mud for maintaining said preselected differential pressure.

7. The apparatus as described in claim 5, wherein said system further comprises:

means for generating an eighth signal indicative of the distance between said first and second depths; and means responsive to said first, fourth and eighth signals for deriving a ninth signal indicative of the expected borehole depth where the bottomhole differential pressure will be reduced to zero when said actual rate of penetration of said drilling apparatus is increasing with depth.

8. Apparatus for determining the bottomhole pressure differential in a well during drilling operations as a function of the magnitude of deviation of the actual rate of penetration of the drill bit through a preselected class of subterranean formations from an expected rate of penetration through said class of formations at a selected depth, said apparatus comprising:

first means for determining the magnitude of change in bottomhole pressure differential at said selected depth as a function of said magnitude of deviation between said rates of penetration at said selected depth;

second means for determining the expected bottomhole pressure differential at said selected depth; and third means for determining the actual bottomhole differential pressure at said selected depth as a function of the difference between the expected differential pressure and the magnitude of change in said differential pressure at said selected depth.

9. The apparatus as described in claim 8, wherein said first means comprises:

signal generating means for deriving a first electrical signal representative of the magnitude of deviation of the actual rate of penetration from the expected rate of penetration at said selected depth; and signal generating means responsive to said first signal for deriving a second signal representative of the magnitude of the change in bottomhole pressure differential at said selected depth and functionally related to a preselected multiple of said magnitude of deviation of the actual rate of penetration at said selected depth.

10. The apparatus as described in claim 9, wherein said second means comprises:

detecting means generating a third electrical signal representative of borehole depth;

detecting means generating a fourth electrical signal representative of the density of the drilling mud circulated in said well during the drilling operation;

signal generating means for deriving a fifth electrical signal representative of the predicted gradient of the pore pressure in the preselected class of formations being penetrated by said drill bit;

signal generating means for deriving a sixth electrical signal representative of the pressure gradient of the drilling mud in said well and functionally related to a preselected multiple of said fourth signal; and signal generating means responsive to said third, fifth and sixth signals for deriving a seventh electrical signal representative of the expected pressure differential between the hydrostatic pressure of the drilling mud at said selected depth and the expected pore pressure in that of said preselected class of formations which is immediately adjacent said drill bit at said selected depth.

11. The apparatus as described in claim 10, wherein said third means comprises: a signal generating means responsive to said second and seventh signals for deriving an eighth electrical signal representative of the actual bottomhole pressure differential at said selected depth and functionally related to the difference between said expected bottomhole pressure differential and said magniture of change in bottomhole pressure differential at said selected depth.

References Cited

UNITED STATES PATENTS

| | | | |
|---|---|---|---|
| 2,539,758 | 1/1951 | Silverman et al. | 73—151.5 |
| 2,957,346 | 10/1960 | Knight | 73—151.5 |
| 3,368,400 | 2/1968 | Jorden et al. | 73—151.5 |

RICHARD C. QUEISSER, Primary Examiner

C. E. SNEE III, Assistant Examiner

U.S. Cl. X.R.

166—66; 175—25, 50; 235—151.3

PO-1050
(5/69)

UNITED STATES PATENT OFFICE
CERTIFICATE OF CORRECTION

Patent No. 3,517,553          Dated June 30, 1970

Inventor(s) Darrell W. Williams and Albert B. Crownover, Jr.

It is certified that error appears in the above-identified patent and that said Letters Patent are hereby corrected as shown below:

Column 3, line 19, "formation" should read --formations--; line 62, "pressure", in its first appearance, should read --pressures--. Column 4, line 39, "port" should read --pore--. Column 7, line 13, "concelled" should read --cancelled--. Column 9, line 9, between "drill" and "through", --bit-- should be inserted. Column 10, line 65, between "long" and "the", --as-- should be inserted. Column 12, lines 31 and 33, "port", in each occurrence, should read --pore--. Column 13, line 49, "descirbed" should read --described--. Column 14, line 44, "50" should read --150--. Column 17, line 51, between "adding" and "240", --circuit-- should be inserted; line 74, "the" should read --to--. Column 18, line 8, "signal" should read --signals--. Column 20, line 42, "ture" should read --tude--.

SIGNED AND
SEALED
OCT 6 - 1970

(SEAL)
Attest:

Edward M. Fletcher, Jr.
Attesting Officer

WILLIAM E. SCHUYLER, JR.
Commissioner of Patents